March 1, 1955 F. W. CLEARY 2,703,382
TWO-WAY LIMITING NETWORK
Filed Dec. 11, 1952
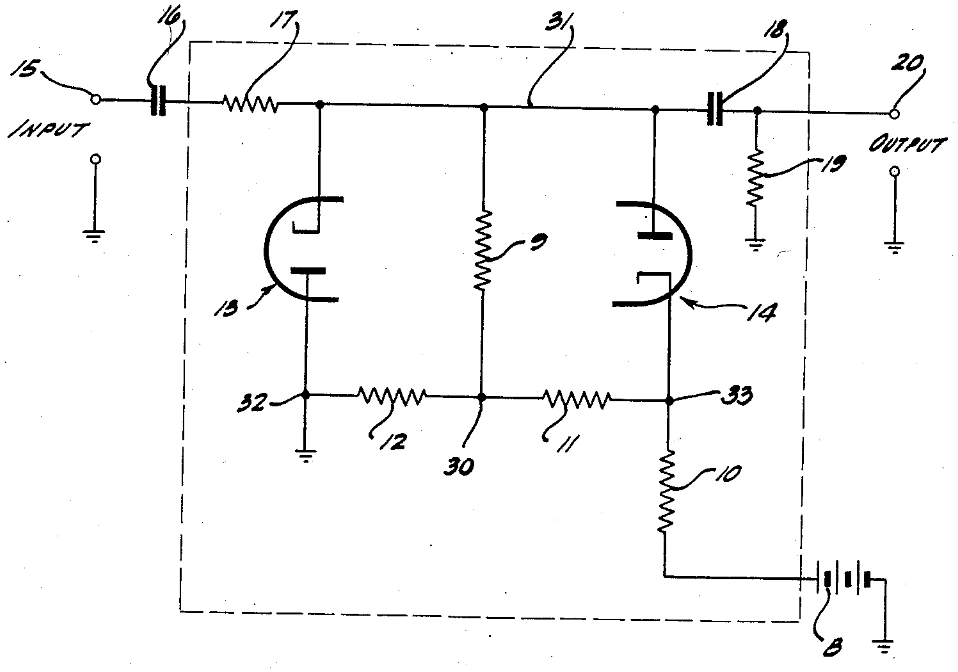
INVENTOR.
FRED W. CLEARY,
BY
Nicholas T Volk
ATTORNEY.

United States Patent Office 2,703,382

Patented Mar. 1, 1955

2,703,382

TWO-WAY LIMITING NETWORK

Fred W. Cleary, Pacific Palisades, Calif., assignor, by mesne assignments, to Hughes Aircraft Company, a corporation of Delaware Application December 11, 1952, Serial No. 325,477

9 Claims. (Cl. 323—19)

The present invention relates to signal limiters and is more particularly concerned with an electronic circuit for accurately limiting diverse forms of input signals between two predetermined limits.

It is well known in the prior art that a signal may be limited in amplitude by shunting an input signal by a biased unidirectionally conductive device. In accordance with the usual operation of such a limiter, a signal in excess of said bias will cause conduction of the device whereby such signals in excess of the predetermined limit are shunted to ground or cause a potential drop across an impedance in series with the conductive device. In the event that two-way limiting is desired, that is, in the event that it is desired to assure that signal amplitudes above and below two predetermined levels, respectively, do not pass to an output, an acceptable circuit comprises two oppositely-poled unidirectional conductive devices each shunted across the signal input. Signals above the first predetermined level cause conduction of one of said devices while other signals below the second predetermined level cause conduction of the other of said devices, each of said conductions serving to prevent portions of signal in excess of the predetermined levels from appearing in the output of the device.

While the foregoing broad concepts are known in the prior art, the actual practical circuitry used in former systems has been subject to a number of distinct disadvantages. Many of the prior art limiters have employed batteries in providing the required bias potentials for the unidirectional conductive devices. Such batteries have formerly been necessary to insure that signals passing through the limiter may be limited with respect to a common reference point, such as ground, and have further been employed in an attempt to simplify the limiter circuitry. Such a system, however, has presented basic disadvantages because of the instability of the batteries per se, the cost of the batteries, the care required in maintenance of the circuit to prevent inaccurate limiting due to aging of the batteries, and the inconvenience of incorporating the batteries in an otherwise electronically powred circuit.

Other disadvantages have appeared in prior art circuitry. Thus, regardless of the battery question, there has been difficulty in isolating the limiting circuit from the stages feeding that circuit so that the operation of the limiter is substantially independent of the input impedance of the signal source. This fact has required special consideration to be given to the use of isolating networks in the design of an over-all electronic system and, more particularly, to the actual impedance of the signal source. The foregoing has been necessary to insure that accurate limiting is effected in the particular circuit involved and has required that the limiter circuitry be changed with a change in the impedance of the signal source. This has, in turn, meant that limiter circuits as utilized in the prior art are relatively inflexible, that a given limiter circuit be utilized in connection with a particular signal source, and that a limiter be designed for each specific application. Still another disadvantage has resided in the fact that, inasmuch as two-way limiter circuits utilizing transformers have previously been designed for a given application, the operation of the limiter has been confined to a specific operation. Thus, a prior art limiter designed for limiting an audio frequency has been ineffective in limiting a video frequency, or an intermediate frequency, or a train of pulses; the same considerations are likewise present in prior art limiters designed to limit one of the other mentioned forms of input signal, thus emphasizing the inflexibility of some prior art limiters.

In certain other forms of prior art limiters, particularly those utilized in connection with an over-all electronic circuit such as an intermediate frequency or other amplifier, or a frequency modulation receiver, in addition to the foregoing disadvantages of inflexibility of design, it has been the practice to utilize a transformer input to the limiter circuit. This of itself entails an economic disadvantage. In addition, however, the distinct disadvantage has been present in that the amount of limiting has been dependent upon the internal impedance of the transformer. That is, while the limiter circuit has been designed to limit between certain theoretical values, nevertheless the conduction of the unidirectional conductive devices used to accomplish limiting merely effects a decrease in the load impedance of the transformer causing a variation in the actual levels at which limiting is desired. This difficulty has been aggravated by the difficulty in predetermining the actual impedance of a device, such as a diode prior to conducting and, further, by the varying impedance which different rectifying devices may present for varying degrees of conduction. In an attempt to minimize this difficulty in prior art two-way limiting circuits, care has had to be taken in the selection of the rectifying devices used. In addition it has been necessary to keep the impedances of the voltage dividing network present in the circuit at a minimum in order that fairly accurate limiting can be achieved; this, in turn, has resulted in the necessity of continuously using a relatively high direct current by the limiter. Notwithstanding the foregoing precautions, the output potentials from prior art two-way limiting devices not using auxiliary batteries still have exceeded the desired limiting potentials by an appreciable percentage.

It is accordingly an object of this invention to provide a limiter circuit having two-way limiting action, without the need of utilizing auxiliary batteries.

Another object of the present invention resides in the provision of a single form of circuitry which may be used with equal effectiveness with diverse signal sources, whether they be audio, intermediate frequency, video, or pulse inputs.

Still another object of the present invention is to provide a simple limiter circuit which operates substantially independent of the input impedance of a signal source and which may, therefore, be readily incorporated in diverse forms of over-all circuitry without change in limiter design.

A still further object of the present invention resides in the provision of a limiter circuit which will limit output potentials to within a small fraction of a percent of the predetermined limiting potentials. In this respect, the present invention further provides circuitry which will not draw excessive or high currents and the operation of which may utilize diverse forms of rectifying elements without undue inaccuracy in the desired limiting potentials resulting from the inherent impedance of the rectifiers used.

The novel features which are believed to be characteristic of the invention, both as to its organization and method of operation, together with further objects and advantages thereof, will be better understood from the following description considered in connection with the accompanying drawings in which a single embodiment of the invention is illustrated by way of an example. It is to be expressly understood, however, that the drawing is for the purpose of illustration and description only, and is not intended as a definition of the limits of the invention.

In accordance with the present invention, two-way limiting action is provided by the utilization of two oppositely-poled unidirectional conductive devices which are capacitively connected through a high resistance across a source of input signals. For convenience of representation conventional diode rectifiers have been shown, but it is to be understood that any other form of unidirectional conductive device may be utilized without departing from the teaching of the invention. Therefore, the use of the term "diode" in the following description and in the claims is meant to include such other forms of devices. The bias potentials are provided by a voltage divider, and this divider is so arranged with respect to the other elements of the circuit that the proper limiting potentials are provided with respect to the various diode electrodes without complexity of circuitry. The limiter circuit itself is isolated from both the input and output circuits by capacitors, thus avoiding the necessity of input and output transformers for isolation and permitting the input and output signals of the limiter to be referred to a point of reference potential such as ground. In addition, the isolating capacitors are so arranged with respect to the voltage divider network that the diodes of the limiter circuit represent a normally non-conductive static connection insofar as the direct current is concerned.

The foregoing circuitry will be more readily understood by reference to the drawing. In this respect certain relative values of circuit components and potentials will be given to illustrate one form of the invention. It will be readily apparent, however, that the particular values to be used may be varied in accordance with the desired signal limits to be achieved.

The basic operating potentials in the present limiter circuit are effected by connecting a voltage divider network, comprising in the instant embodiment resistors 10, 11, and 12, across a source of potential B. Potential source B is the full B+ operating potential present in the over-all circuitry with which the limiter is utilized, and may take the form of the regulated power pack normally present in such circuitry. In order to effect limiting at ±1 volt, for example, resistors 11 and 12 are of the same magnitude, and their value is so chosen with respect to resistor 10 and power supply B that a static potential of +1 volt is developed at the common junction 30 of resistors 11 and 12, and a further potential of +2 volts is developed at the common junction 33 of resistors 10 and 11. A resistor 9 is coupled between junction 30, which is at +1 volt, and a conductor 31, the resistor 9 serving to maintain the static potential normally present on conductor 31.

A first diode 13 is connected between ground point 32 and the conductor 31 and poled so that the cathode of diode 13 is normally at the potential of conductor 31 while its plate is at ground potential. Similarly, a further oppositely-poled diode 14 is connected between conductor 31 and junction point 33 so that its plate is at the potential of conductor 31 while its cathode is maintained at the +2 volt potential of junction 33.

The limiting network of the present circuit is connected between an input 15, which may be any appropriate signal source, and an output 20. As shown in the drawing, the input 15 is referred to ground potential, and is coupled to the conductor 31 by serially-connected capacitor 16 and a resistor 17. Similarly, the conductor 31 is coupled through a further capacitor 18 to the output 20, the output of the circuit being developed across a resistor 19. Both the input 15 and output 20 of the circuit are isolated from the limiting circuit itself by capacitors 16 and 18, so that no direct current can flow through resistor 9 thereby causing conductor 31 to assume the static potential of junction 30, namely +1 volt.

Examining the individual diodes 13 and 14, it is apparent that, in the absence of an input signal, the cathode of diode 13 is at +1 volt, while its plate is at ground potential. Therefore, the diode 13 cannot conduct until the potential on conductor 31 falls below ground potential. Inasmuch as conductor 31 is normally at +1 volt, this will occur when an input signal of more than −1 volt appears on conductor 31 to cause the composite voltage to go negative with respect to ground.

The diode 14, on the other hand, has its plate maintained at +1 volt while its cathode is at +2 volts. Therefore, once more, the diode 14 is nonconductive until the composite potential on conductor 31 exceeds +2 volts. Again, since conductor 31 is normally at +1 volt, this will occur when a signal of more than +1 volt appears on conductor 31. The circuit, as disclosed, therefore, provides a limiting action between +1 and −1 volts with respect to ground.

Considering the actual operation of the circuit disclosed, it will be seen first that the limiter itself is completely isolated with respect to direct or steady state potentials from both the input and output of the system and that the operation of the circuit is independent of both the impedance of the signal source impressed upon terminals 15, and of the form of signal input so long as the impedance of the source is in the range to provide a reasonable power transfer from the source to the limiter. When the amplitude of the input signal is within the limits of +1 and −1 volts at conductor 31, the signal will be coupled through capacitor 16, resistor 17, and capacitor 18, and will appear across resistor 19 at output terminals 20. Under these circumstances both diode 13 and diode 14 offer a very high impedance from conductor 31 to ground, with the result that a portion of the input signal determined by a voltage dividing network comprising resistors 17 and 9 appears at the output 20. If a signal sufficiently large to develop a voltage more negative than −1 volt on conductor 31 is impressed at input 15, the diode 13 will be rendered conductive and that portion of the signal voltage which exceeds −1 volt limit will be shunted by the diode 13 to ground. Resistor 17 is desirable during this phase of the operation of the circuit because of the finite resistance of diode 13, when conductive, and since the most of the potential drop occurs across resistor 17, practically no output is obtained at terminals 20 in excess of the limiting potentials which are supplied to the diodes 13, 14 at this instant by source B through the resistors 9, 10, 11, and 12.

When a signal sufficiently large to develop a voltage more positive than +1 volt on conductor 31 appears at input terminals 15, the diode 14 will be rendered conductive as has been discussed previously. The signal is therefore again shunted to ground through diode 14, and resistors 11 and 12. Once more the major portion of the potential drop is developed across resistor 17, so that practically no output in excess of +1 volt appears at terminals 20.

Although it has been stated that "practically no output" in excess of +1 or −1 volts appears at the output terminals 20 in the foregoing circumstances, it must be understood that the magnitude of resistor 17 is so chosen with respect to the other resistances present, that the very small signal which may be present at the output in excess of the limiting potentials is well within the practical limits desired in view of the finite operating requirements of any circuit which may be coupled to output 20.

It should be noted that when the potential of conductor 31 assumes a value so as to render either one of the diodes 13 or 14 conductive through an extended period of time, the signal appearing at the output 20 is maintained at the +1 or −1 value of potential by the capacitor 18-resistor 19 combination. Capacitor 18 and resistor 19 must, therefore, have a time constant suitable for the lowest frequency contemplated in the impressed signal.

In the light of the description of the limiting circuit, it follows that the potential developed on conductor 31 with respect to ground determines the polarity and the magnitude of the signal impressed on the output circuit. Inasmuch as conductor 31 connects to substantially all the elements of the circuit, it will be referred to as a common junction in some of the claims that follow.

Inasmuch as resistors 9 and 17 form a portion of a voltage dividing network for the input signal when diodes 13 and 14 are non-conductive and are therefore not limiting, resistor 9 should be at least as large as resistor 17. Resistor 17 should be large in comparison to the combined values of resistors 11 and 12 so that the output voltage will not exceed the desired limiting potentials. The values of resistors 11 and 12 are equal in the particular embodiment described, in view of the desired tap-off potentials on the voltage divider. The relative magnitude of resistors 11 and 12 will, of course, depend upon the relative limiting potentials desired. Again, resistor 9 may be replaced by a choke under proper signal circumstances, although such replacement has a number of disadvantages. For example frequency response characteristic will be non-uniform with the concomitant non-uniform limiting action, and it also will introduce distortion including the phase shift. An additional and final consideration is a matter of cost, that is, replacing resistor 9 with a choke coil will increase the cost of the circuitry, and thus further limit its usefulness.

Exemplary values of the circuit components for ±1 volt limiting circuit described here are as follows:

| | |
|---|---|
| B supply | 250 volts. |
| Resistor **10** | 24,000 ohms. |
| Resistor **11** | 100 ohms. |
| Resistor **12** | 100 ohms. |
| Resistor **9** | 220,000 ohms. |
| Resistor **19** | 470,000 ohms. |
| Resistor **17** | 230,000 ohms. |
| Capacitor **16** | .2 microfarad. |
| Capacitor **18** | .2 microfarad. |
| Diodes **13** and **14** | Any type of diode. |

In the case that different limiting potentials are desired, the magnitudes of resistors 11 and 12 must be changed accordingly. For example, an increase in the resistance of resistor 12 would increase the negative limiting potential and an increase in the resistance of resistor 11 would increase the positive limiting potential.

What is claimed as new is:

1. A two-way limiter for limiting the positive and negative excursions of a signal passing through said limiter, said two-way limiter comprising a common junction, an output circuit capacitively coupled to said junction, a first resistor, an input circuit capacitively coupled through said first resistor to said common junction, first and second diodes each having a cathode and an anode, the cathode of said first diode and the anode of said second diode being connected to said common junction, a potential divider network having first and second taps, a reference junction maintained at a substantially fixed potential, means for impressing a direct positive potential relative to said substantially fixed potential across said potential divider network whereby said first tap provides a first direct potential with respect to said reference junction and said second tap provides a second direct potential with respect to said reference junction, said first potential being of greater magnitude than said second potential, a direct connection from the plate of said first diode to said reference junction, a second resistor interconnecting said common junction with said second tap, the position of said second tap substantially determining the negative limiting potential of said limiter, a direct connection from the cathode of said second diode to said first tap, the position of said first tap with respect to said second tap on said divider substantially determining the positive limiting potential of said limiter.

2. A two-way limiter circuit for limiting the positive and negative excursions of a signal passing through said limiter circuit, said two-way limiter circuit comprising a common junction; a potential divider network having first and second taps and a reference junction, said reference junction being maintained at a substantially fixed potential and said second tap being positioned between said first tap and said reference junction; means for impressing a direct potential across said network whereby said first tap provides a first direct potential and said second tap provides a second direct potential with respect to said reference junction; a first resistor interconnecting said common junction with said second tap; a first unidirectionally conducting device connected between said common junction and said first tap; a second unidirectionally conducting device connected between said common junction and said reference junction, said first and second devices being poled to be normally nonconductive; an input circuit including a capacitor and a second resistor connected in series to said common junction; and an output circuit capacitively coupled to said common junction.

3. The two-way limiter circuit as defined in claim 2 wherein the magnitude of said first resistor is approximately equal to the magnitude of said second resistor.

4. The two-way limiter circuit as defined in claim 3 wherein the magnitude of said first resistor is also at least ten times greater than the resistance of said potential divider network between said first tap and said reference junction.

5. A two-way limiter circuit comprising a first resistor having first and second taps, said second tap being intermediate said first tap and one extremity of said resistor; means for impressing a potential across said first resistor; first and second unidirectionally conducting devices connected in series from said first tap on said first resistor to said one extremity, said unidirectionally conducting devices being poled in a like direction in said series circuit and connected to be normally nonconductive; a second resistor interconnecting the common junction between said unidirectionally conducting devices and said second tap on said first resistor; an input circuit including a capacitor and a third resistor connected in series to said common junction; and an output circuit capacitively coupled to said common junction.

6. A limiter circuit comprising a loop circuit including serially connected first, second and third resistors and a source of direct potential having positive and negative terminals, said positive terminal being connected to said first resistor and said negative terminal being connected to said third resistor, a common bus and first and second diodes, each having a plate and a cathode, the plate of said first diode being connected to said negative terminal and its cathode to said bus; the cathode of said second diode being connected to a junction between said first and second resistors and its plate connected to said bus, a fourth resistor connected between said bus and a junction between said second and third resistors, and input and output circuits capacitively connected to said bus.

7. A limiter circuit as defined in claim 6 in which said second and third resistors have equal values, whereby the respective voltage drops produced across said second and third resistors by said source are equal, said voltage drops creating biasing potentials for said diodes to keep them nonconductive as long as the voltage signals impressed on said bus by said input circuit do not exceed biasing potentials.

8. A limiter circuit as defined in claim 6 in which the value of said second resistor and the voltage drop across said second resistor is made to correspond to the desired maximum negative amplitude of output signal, and the value of said third resistor and the voltage drop across said third resistor is made to correspond to the desired maximum positive amplitude of output signal.

9. A limiter circuit as defined in claim 6 in which said input circuit includes a serially connected input resistor and capacitor connected to said bus, the order of magnitude of said input resistor being comparable to the order of magnitude of said fourth resistor, and the order of magnitude of each of said second and third resistors being approximately 0.1 the magnitude of said fourth resistor.

References Cited in the file of this patent

UNITED STATES PATENTS

| | | |
|---|---|---|
| 1,951,148 | Grinsted | Mar. 13, 1934 |
| 2,227,197 | Percival | Dec. 31, 1940 |
| 2,338,412 | Dallas | Jan. 4, 1944 |
| 2,418,480 | Pritchard et al. | Apr. 8, 1947 |
| 2,438,518 | Piety | Mar. 30, 1948 |
| 2,497,693 | Shea | Feb. 14, 1950 |